United States Patent
Porter (10) Patent No.: US 6,357,040 B1
(45) Date of Patent: *Mar. 12, 2002

(54) USAGE CHARACTERISTIC BASED SOFTWARE CUSTOMIZATION

(75) Inventor: Swain W. Porter, Kirkland, WA (US)

(73) Assignee: Wildseed Limited, Kirkland, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,692

(22) Filed: Oct. 21, 1998

(51) Int. Cl.[7] .................................................. G06F 9/45
(52) U.S. Cl. .................................. 717/9; 717/4; 717/8
(58) Field of Search .............................. 717/9, 8, 4, 11

(56) References Cited

U.S. PATENT DOCUMENTS

| | | |
|---|---|---|
| 4,466,063 A | 8/1984 | Segarra et al. |
| 4,558,413 A | 12/1985 | Schmidt et al. |
| 4,894,846 A | 1/1990 | Fine |
| 5,313,387 A | 5/1994 | McKeeman et al. |
| 5,919,247 A | 7/1999 | Van Hoff et al. |

OTHER PUBLICATIONS

Bowdidge et al., "Supporting the Restructuring of Data Abstractions through Manipulation of a Program Visualization", ACM, pp/ 109–157, Apr. 1998.*

Cortes et al., "DCWPL: A Programming Language for Describing Collaborative Work", ACM, pp. 21–29, Nov. 1996.*

Jamji et al., Distributed andOptimistic Make: Implementation and Performance, IEEE, Apr. 1992, p. 531–538, entire document.

Adams et al., The Cost of Selective Recompilation and Environment Processing, Jan. 1994, ACM, pp. 3–28, entire document.

Yellin et al., INC: A Language for Incremental Computations, ACM, Apr. 1991, pp. 211–236, entire document.

Tichy, Smart Recompilation, ACM, Jul. 1986, pp. 273–291, entire document.

Hood et al., Efficient Recompilation of Module Interfaces in a Software Development environment, ACM, Dec. 1986, pp. 180–189, entire document.

Theimer et al., Heterogeneous Process Migration by Recompilation, IEEE, May 1991, pp. 18–25, entire document.

Basili et al., "Calculation And Use of An Environment's Characteristic Software Metric Set", IEEE, pp. 386–391, 1985.*

* cited by examiner

Primary Examiner—Tuan Q. Dam
Assistant Examiner—Ted T. Vo
(74) Attorney, Agent, or Firm—Columbia IP Law Group, PC (57) ABSTRACT

Software is customized by generating, for a first set of software objects having usage characteristic data collected, a second set of software objects to totally or partially replace the first set of software objects. The second set of software objects is generated based at least in part on the collected usage characteristic data of the first set of software objects. In one embodiment, the generation includes optimizing the second set of software objects being generated based on the usage characteristic data, which include calling frequencies of caller/callee objects of the first set of software objects. In one embodiment, the generation is automatically performed at idle periods of the user's system, if the usage characteristics are determined to be sufficiently changed.

9 Claims, 10 Drawing Sheets

| FUNCTION NAME | Y/N |
|---|---|
| | |
| | |
| | |
| | |

FIG. 3b

| CALLER/CALLEE ID | INVOC. COUNT |
|---|---|
| | |
| | |
| | |
| | |

USAGE CHARACTERISTIC BASED SOFTWARE CUSTOMIZATION

BACKGROUND OF THE INVENTION

1. Field of the Invention

The present invention relates to the field of computer systems. More specifically, the present invention relates to methods and apparatuses associated with customizing software executed on computer systems.

2. Background Information

It is axiomatic that one size does not fit all. Thus, virtually all software vendors allow customization to be made to their software. However, prior art software customization is typically limited to a range of user selections, such as the selection of certain operating parameters, e.g., the background color for the screen display, and the selection of whether certain features are to be installed, e.g., accessibility features for "access challenged" users. These prior art user selection based approaches suffer from at least one or more of the following disadvantages:

1. They require the user/installer to make the choices;
2. In order for the user/installer to make the choices, they require the user/installer to have prior knowledge of the user's preference;
3. In the case of a "novice" user, they require the intervention of the installer to reinstall the software if the installer did not make the correct feature selection at install time, or if the user requirement subsequently changes;
4. They do not address interoperability issues between different program products; and
5. They also do not address field upgradability issues.

Thus, a more effective and user friendly approach to software customization is desired.

SUMMARY OF THE INVENTION

Software is customized by generating, for a first set of software objects having usage characteristic data collected, a second set of software objects to totally or partially replace the first set of software objects. The second set of software objects is generated based at least in part on the collected usage characteristic data of the first set of software objects. In one embodiment, the generation includes optimizing the second set of software objects being generated based on the usage characteristic data, which include calling frequencies of caller/callee objects of the first set of software objects. In one embodiment, the generation is automatically performed at idle periods of the user's system, if the usage characteristics are determined to be sufficiently changed.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as tables, files, data and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented.

Figure 1:
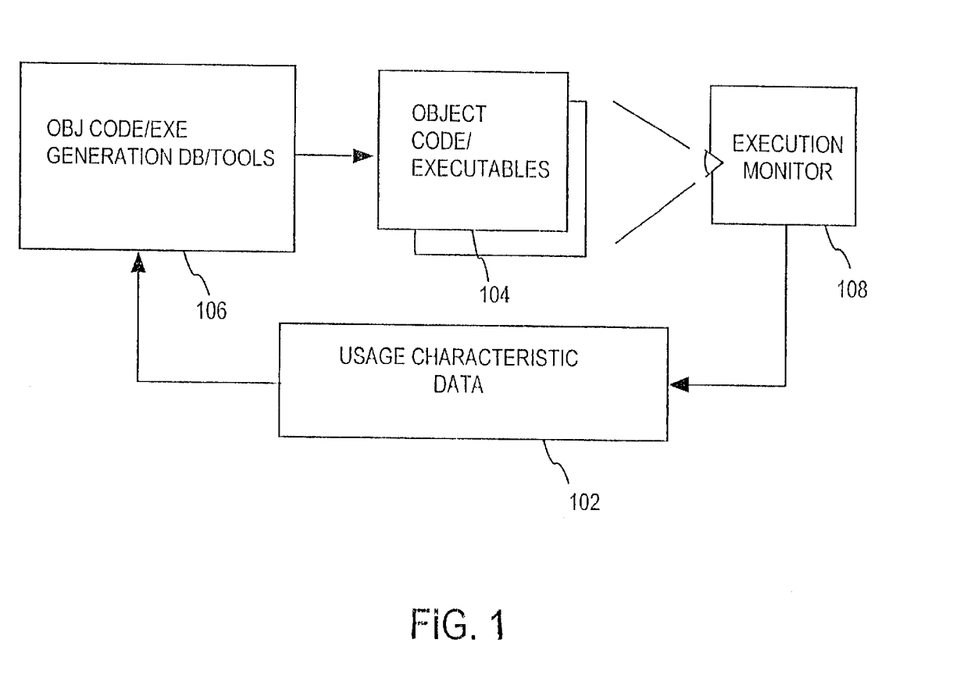
FIG. 1 provides an overview of the present invention.

Referring now to FIG. 1, wherein an overview of the present invention in accordance with one embodiment is shown. As illustrated, in accordance with the present invention, usage characteristic data 102 are collected for object code/executables 104 (also referred to as software objects or modules). The collected usage characteristic data 102 of object code/executables 104, in turn, are advantageously employed, e.g. by object code/executables generation databases/tools 106, to generate total or partial replacements for object code/executables 104. As will be described in more details below, the present invention may be practiced in association with a number of software distribution approaches, in particular, a distribution approach where the object code/executables are generated on the user's system (or its proxy, such as a "corporate/publisher" server. In one embodiment, the replacement generation is automatically performed at idle periods of the user's system (or its proxy), if collected user characteristic data 102 denote sufficient changes in the usage characteristic of object code/executables 104.

Object code/executables 104 are intended to represent a broad category of software objects/modules, including software objects/modules of software systems, sub-systems as well as applications and the like. As will be readily apparent form the description to follow, the present invention does not impose any limitations on the type and/or structural organization of the software with which the present invention may be practiced.

For the illustrated embodiment, usage characteristic data 102 is collected by execution monitor 108. In alternate embodiments, usage characteristic data 102 may be generated by object code/executables 104 themselves, in lieu of or in addition to execution monitor 108. Any one of a number of execution monitors known in the art may be employed as execution monitor 108. An example is the product Leggo available from Microsoft Inc. of Redmond, Wash., for the Windows® operating environment. Similarly, any one of a number of trace data generation techniques known in the art may be employed by object code/executables 104 to leave an execution trail of usage characteristic, in those embodiments where object code/executables 104 are to generate usage characteristic data 102 in whole or in part.

Figure 2:
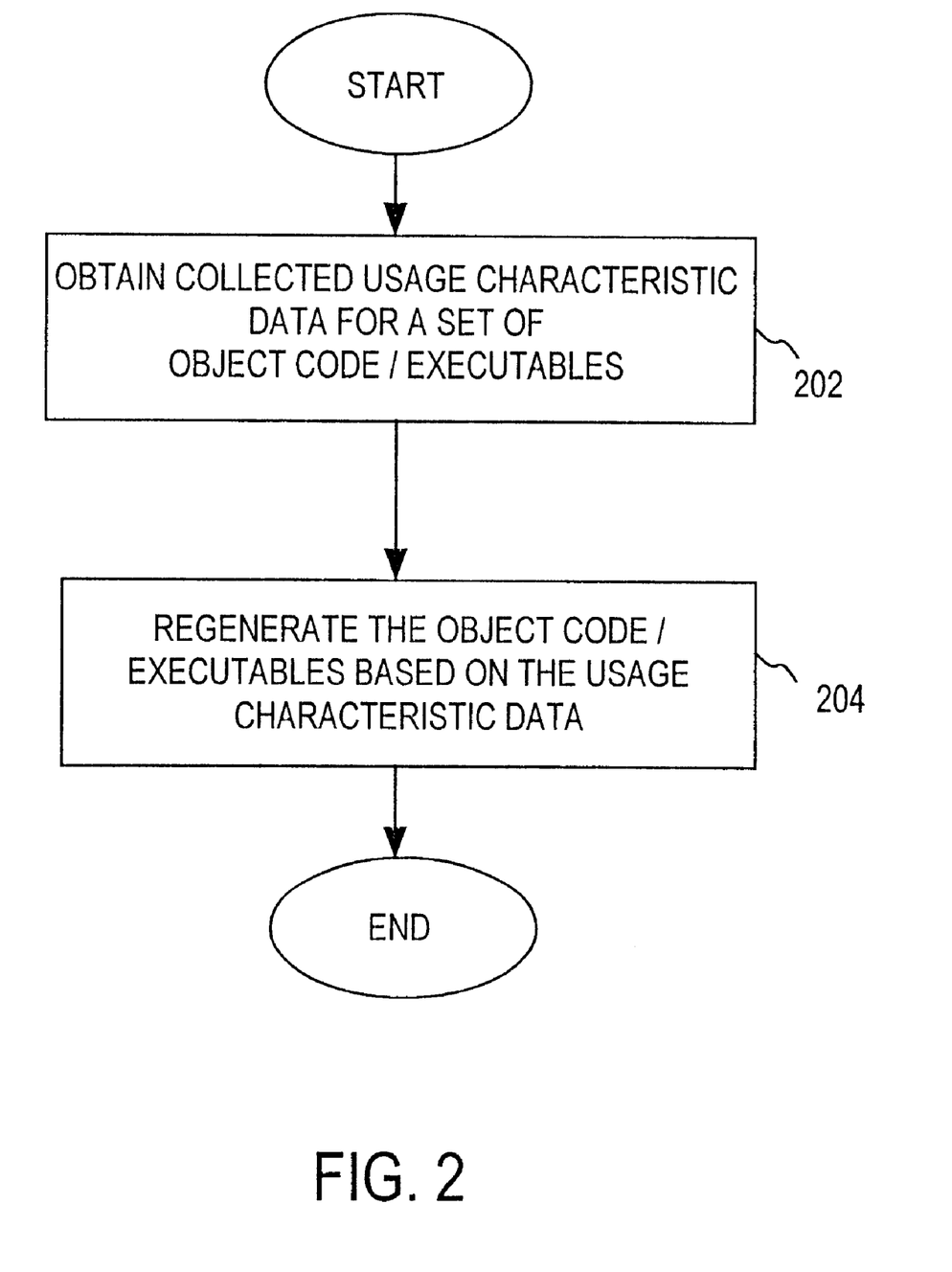
FIG. 2 illustrates one embodiment of the method steps for practicing the present invention.

FIG. 2 illustrates one embodiment of a method for practicing the present invention. As shown, at step 202, the generation databases/tools obtain the collected usage characteristic data for a set of object code/executables. The set of object code/executables may be for one or more components of one or more software systems/subsystems. Next, at step 204, the generation databases/tools generates a replacement (or successor) set of object code/executables to totally or partially replace the predecessor set of object code/executables. The generation databases/tools generate the replacement (or successor) set of object code/executables based at least in part on the obtained usage characteristic data.

Figure 3A:
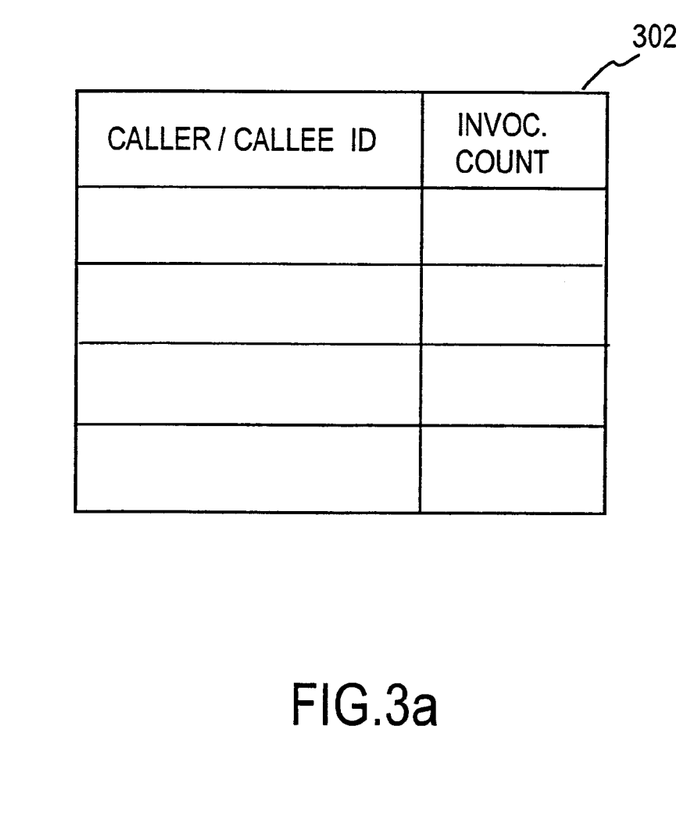
FIGS. 3a–3b illustrate one embodiment each of two exemplary usage characteristic data suitable for use to practice the present invention.
Figure 3B:
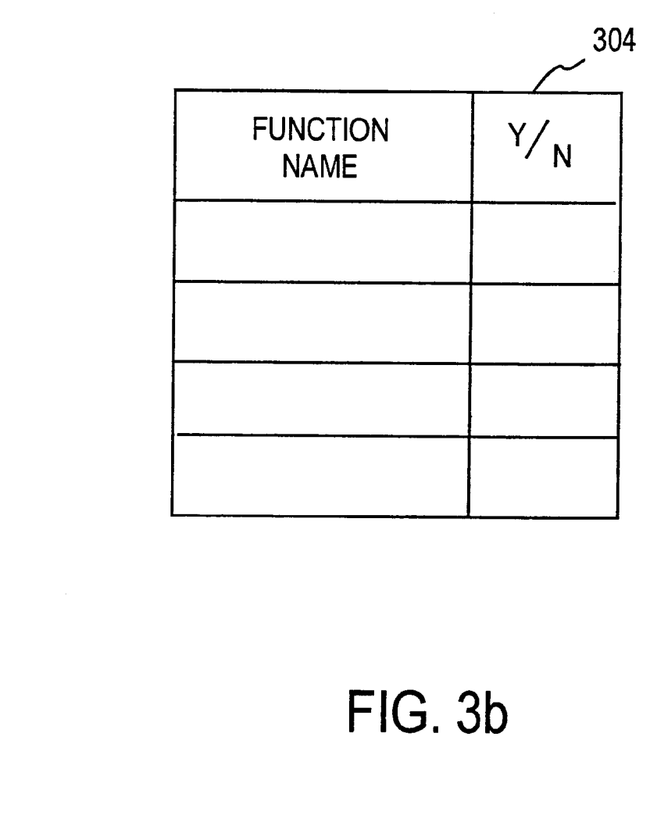

FIGS. 3a–3b illustrate one embodiment each of two exemplary usage characteristic data suitable for use to practice the present invention. As shown in FIG. 3a, the calling frequencies of caller/callee objects of a set of software objects of interest are collected and maintained in table 302. In one embodiment, a variable for each caller/callee relationship is provided to the set of software objects of interest, to facilitate the execution monitor to monitor and keep track the frequencies the caller objects invoke the callee objects. For the illustrated embodiment, the first time a callee object is invoked by a caller object, an entry including the name of a corresponding caller/callee variable and an initial count of one is created and stored in table 302. Thereafter, the invocation count is incremented each time the callee object is invoked again by the caller object.

FIG. 3b illustrates another user characteristic data that may be employed in lieu of or in addition to the calling frequency characteristic of FIG. 3a.

As shown, instead of calling frequencies, the mere fact of whether a function of a set of software objects of interest is invoked, is collected for all functions, and maintained in table 304. In one embodiment, a variable for each function is provided to the set of software objects of interest, to facilitate the execution monitor to monitor and keep track whether the function is invoked or not. For the embodiment, the first time the function is invoked, an entry including the name of the function variable and an invocation indicator is created and stored in table 304.

The present invention may be practiced with either one or both of the illustrated usage characteristic data, in the generation of the replacement software objects/modules. Furthermore, other usage characteristic data may be employed in lieu of (in part or in whole) or in addition to the illustrated usage characteristic data.

Figure 4:
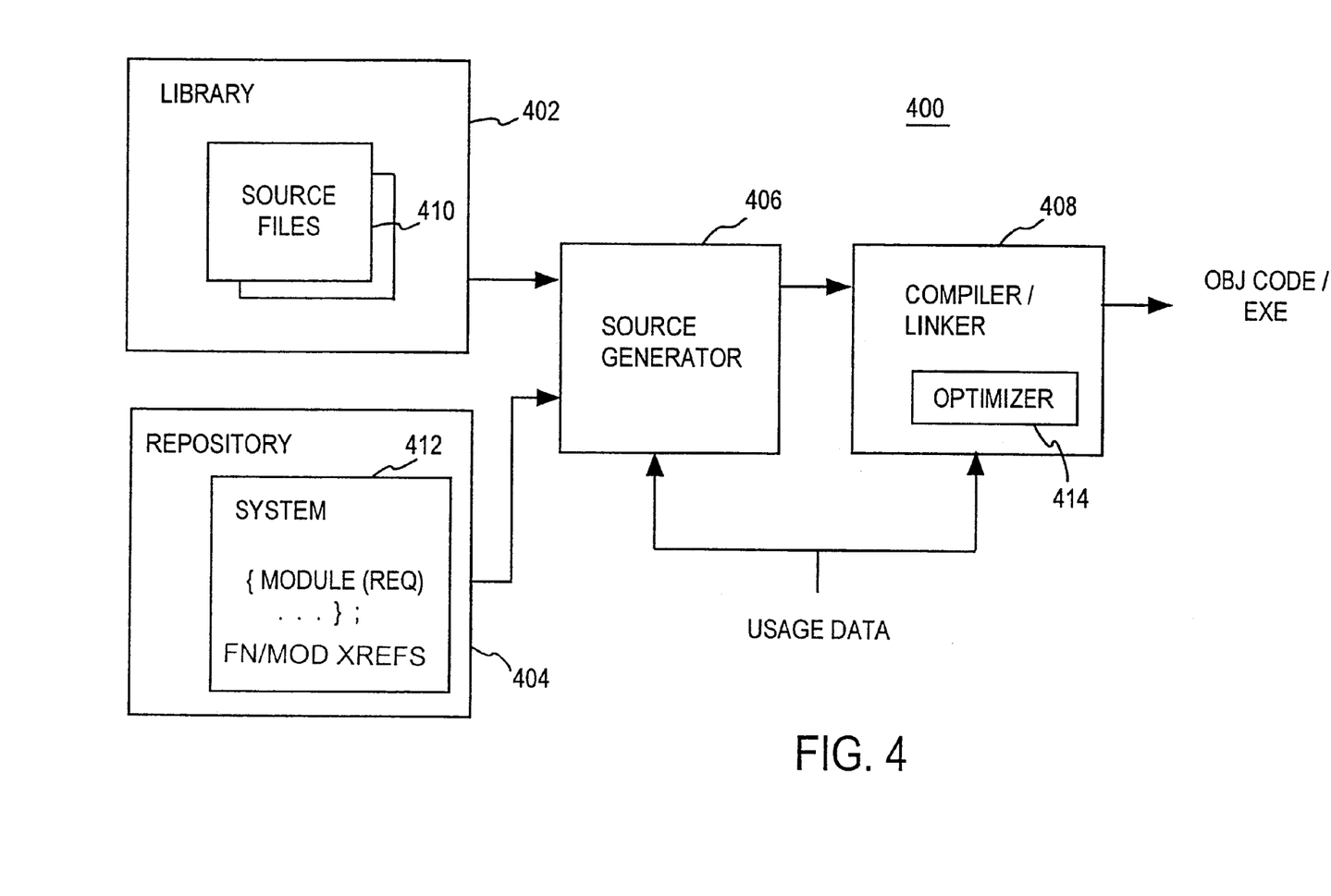
FIG. 4 illustrates one embodiment of the software generation databases/tools of FIG. 1.

FIG. 4 illustrates one embodiment of object code/executables generation databases/tools suitable for use to practice the present invention. As shown, for the illustrated embodiment, object code/executables generation databases/tools 400 include library 402, repository 404, source generator 406 and compiler/linker 408 (including optimizer 414). Library 402 is used to store source files 410 of the object code/executables, whereas repository 404 is used to store control information 412 associated with source files 410. In one embodiment, control information 412 includes in particular, identification of the source files required to generate any particular software system/subsystems installed, including cross reference information cross referencing functions to objects/modules as well as objects/modules dependency information. In one embodiment, source files 410 are maintained in a base and delta form, and control information 412 includes control information describing the delta structure. Except for the manner in which library 402 and repository 412, including the respective contents stored therein, are used to practice the present invention, library 402 and repository 412 are intended to include a number of source control systems or versioning control systems known in the art, as well as the novel source control system described in co-pending U.S. patent application No. <to be inserted>, entitled "User Centric Source Control System", which is filed contemporaneously and assigned to the same assignee of the present invention. The co-pending application (except for its reciprocate incorporation) is hereby fully incorporated by reference.

For the illustrated embodiment, source generator 406 is used to retrieve and constitute the source files of interest using the contents stored in library 402 and repository 404, whereas compiler/linker 408 is used to generate, e.g. compile and link, the object code/executables of interest. Both source generator 406 and compiler/linker 408 perform their respective functions based at least in part on collected usage characteristic data of the object code/executables of interest. In an alternate embodiment, both source generator 406 and compiler/linker 408 also support switches that allow them to function in a conventional manner, that is without taking into consideration the collected usage characteristic data of the object code/executables of interest. Except for this incorporation of the teachings of the present invention, source generator 406 and compiler/linker 408 are otherwise also intended to represent a broad category of these elements known in the art. Thus, except for one embodiment each of an exemplary implementation of the teachings of the present invention, source generator 406 and compiler/linker 408 will not be otherwise generally described.

Figure 5:
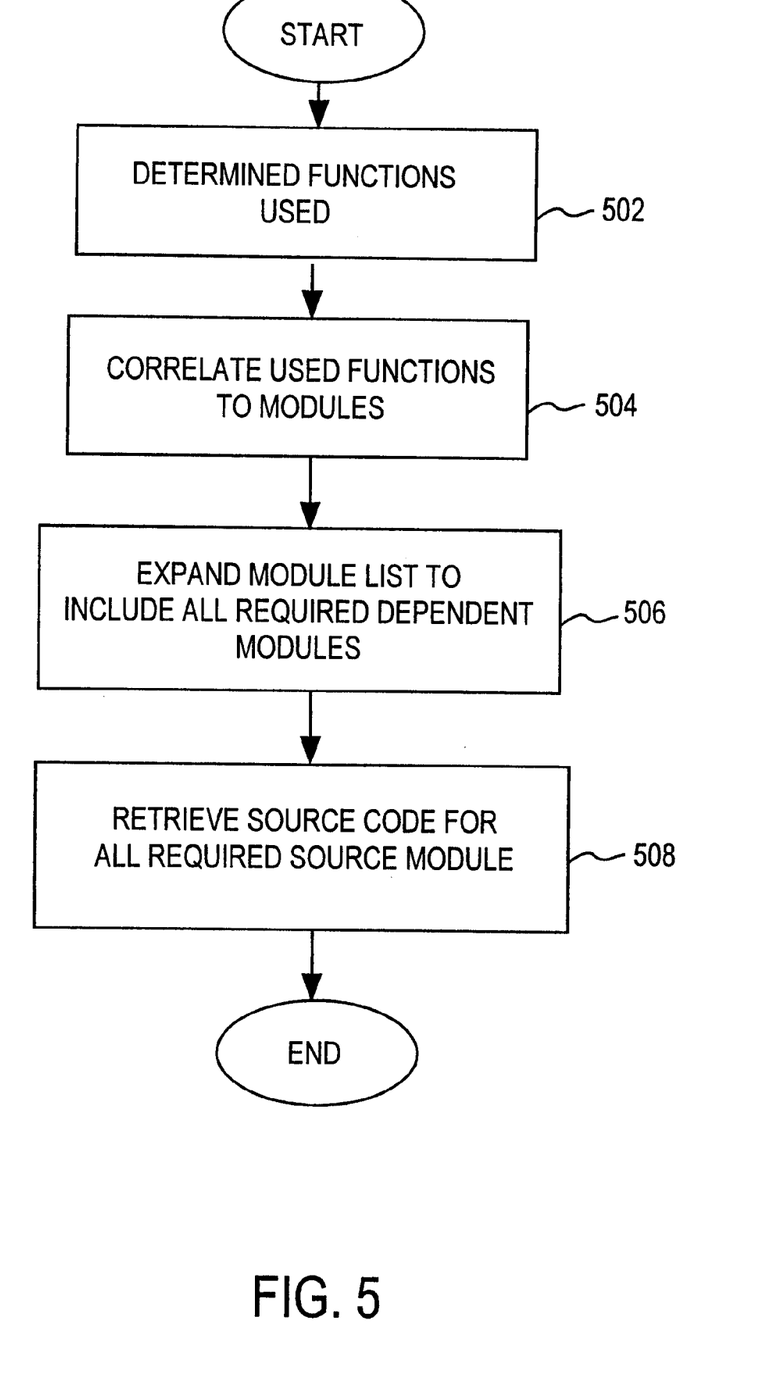
FIG. 5 illustrates one embodiment of the operational flow of the source generator of FIG. 4.

FIG. 5 illustrates one embodiment of the operational flow of source generator 406 to practice the present invention. As shown, at step 502, source generator 406, based on the obtained usage characteristic data determines the usage characteristic for the functions of the software objects of interest. Next, using cross-reference control information 412 in repository 404, source generator 406 correlates the used functions to the modules implementing the functions to identify the objects/modules required in the replacement objects/modules, step 504. Then, using the dependency control information 412 in repository 404, source generator 406 expands the initial list of required objects/modules to include the dependent objects/modules, step 506. Finally, source generator 406 retrieves (and reconstitutes, if applicable, e.g. in a delta based system) the required source files 410 from library 402, step 508.

In an alternate embodiment, source generator 406 further determines whether it is necessary to recompile and/or linkedit the required objects/modules, and retrieving (reconstituting) only the required source files that need to be recompiled/linkedited, thereby reducing the amount of compiling and linkediting performed by compiler/linker 408.

Not all objects/modules determined to be required in view of the usage characteristic data need to be recompiled and relinkedited. Recompilation and re-linkediting are necessary only if the make up of certain interrelated objects/modules change. For example, if it is determined that the user uses graphics function, and the required graphics objects/modules were among the existing objects/modules, and there are no change to their make up, recompilation and re-linkediting are not necessary. On the other hand, if it is determined that the user uses 3-D graphics, and selected ones of the required graphics objects/modules are to be regenerated with certain more advanced versions of graphics algorithms, then recompilation and re-linkediting would be necessary. Note that recompilation and re-linkediting for other non-impacted objects/modules would still be unnecessary.

Figure 6:
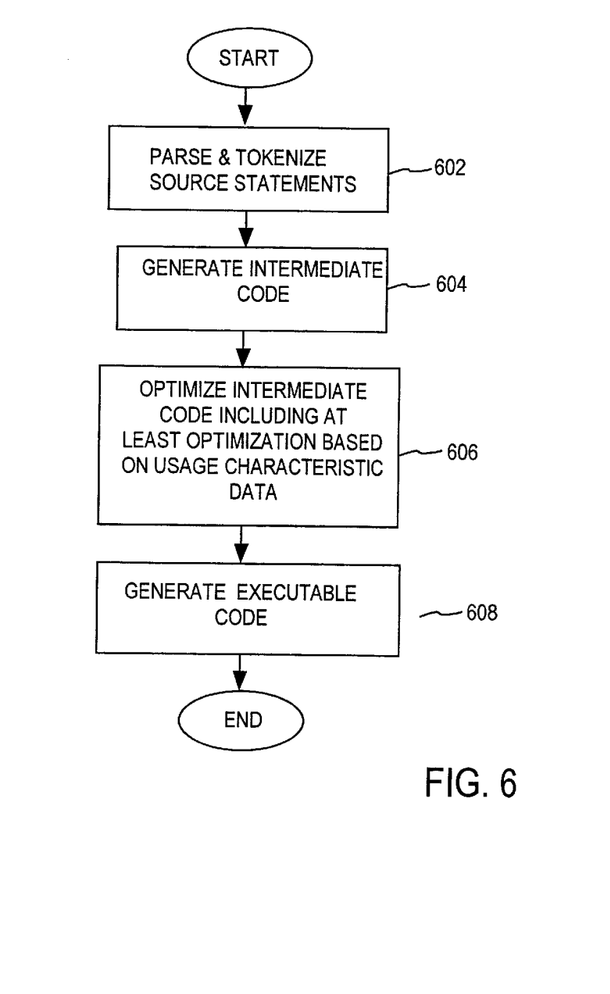
FIGS. 6–7 illustrate one embodiment of the operational flow of the compiler of FIG. 4.

FIG. 6 illustrates one embodiment of the operational flow of compiler/linker 408 to practice the present invention. As shown, compiler/linker 408 first parses and tokenizes the source statements of the source files generated by source generator 406, step 602, and then generates intermediate code for the tokenized source statements, step 604, as other compilers/linkers known in the art. Next, using the intermediate code, compiler/linker 408 optimizes the object code/executables being generated, step 606. For the illustrated embodiment, at least one aspect of the optimizations performed is based on the obtained usage characteristic data of the software objects of interest. Finally, compiler/linker 408 generates and linkedits the optimized object code as other compilers/linkers known in the art.

Figure 7:
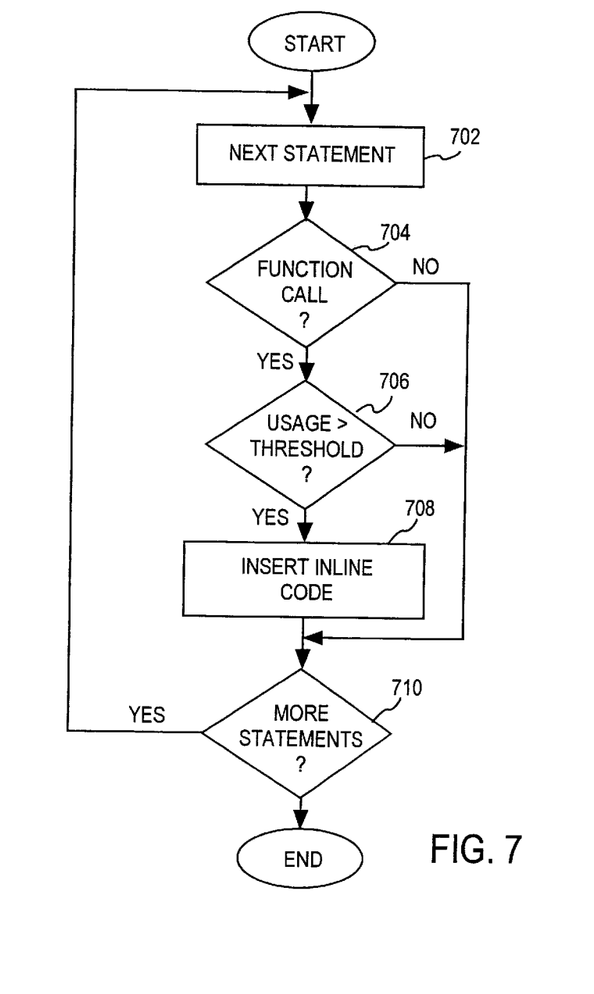

FIG. 7 illustrates one embodiment of the operational flow of optimizer 414 of compiler/linker 408. As shown, the optimizer of compiler/linker 408 examines the intermediate code for function calls; for the illustrated embodiment, one statement at a time, steps 702–704 and 710. If the statement examined is not a function call, the optimizer proceeds to another statement. However, upon detection of a function call, the optimizer examines the usage characteristic data to determine whether the usage exceeds certain predetermined threshold, justifying optimization of the function call, step 706. For example, the determination may be made by simply examining whether the function is invoked at all, or whether the callee function is invoked with a frequency greater than certain predetermined threshold. Other usage metrics and criteria may be employed. If the usage does not justify optimization of the function call, the optimizer proceeds to another statement, step 710. Otherwise, the optimizer replaces the function call with in-line instructions to implement the function call, e.g. by replacing the function call with the callee function's instructions, step 708, similar to the technique of "loop unrolling" known in the art. Those skilled in the art will appreciate that other conventional optimizations may also be performed in conjunction with the usage characteristic based optimization of the present invention.

Figure 8:
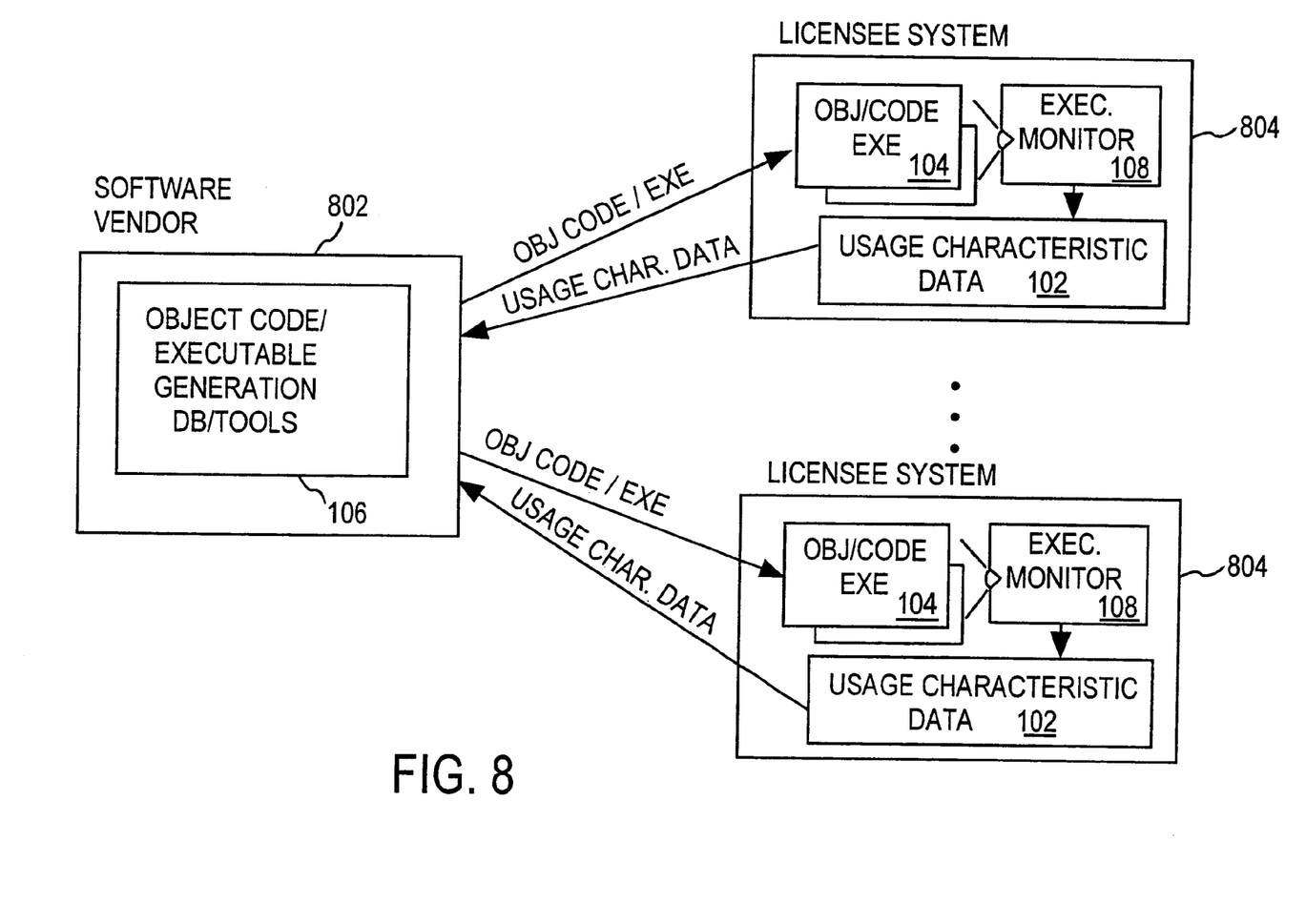
FIGS. 8–9 illustrate one embodiment each of two exemplary software distribution approaches suitable for practicing the present invention.
Figure 9:
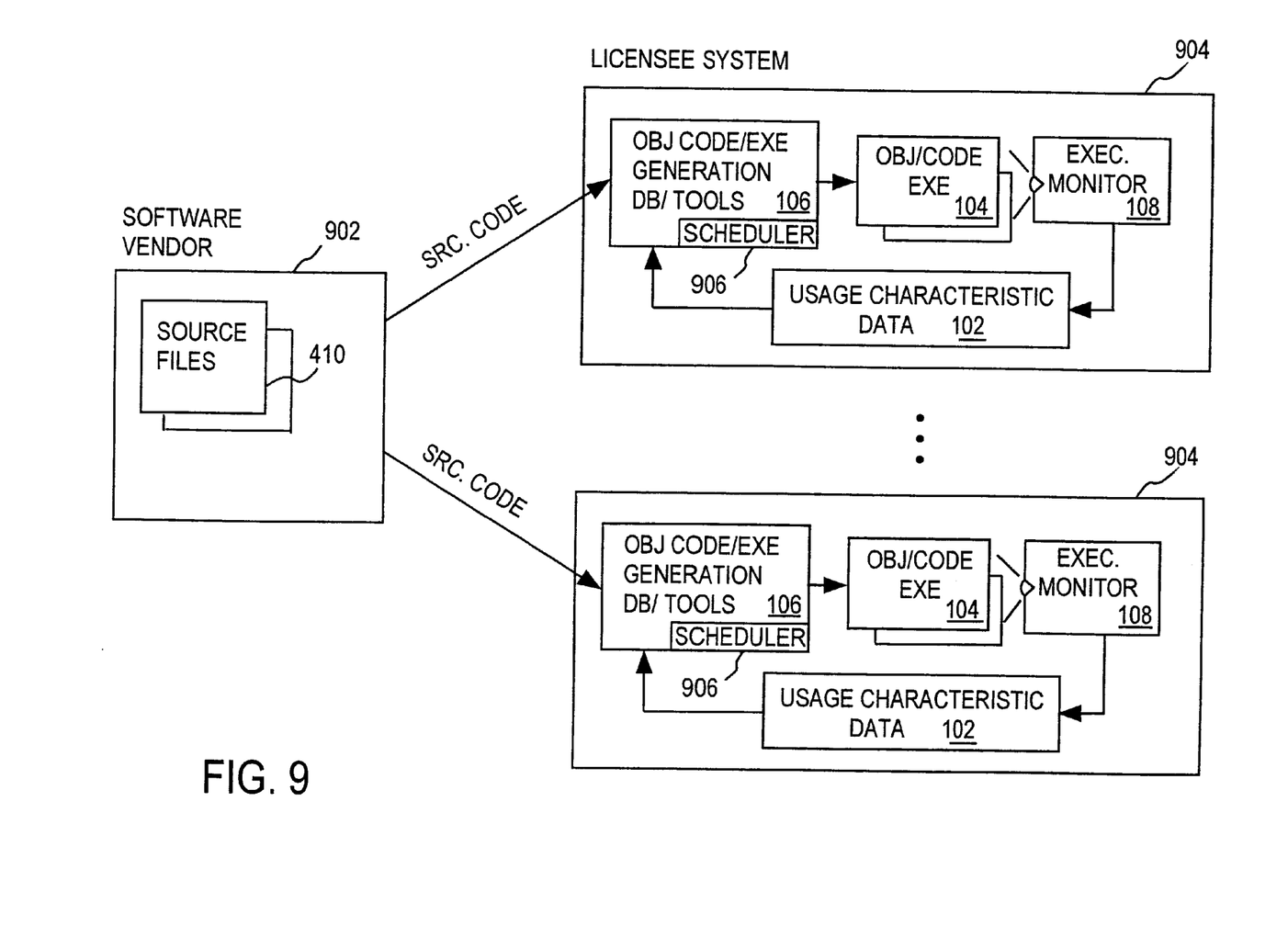

FIGS. 8–9 illustrate one embodiment each of two exemplary software distribution approaches with which the present invention may be practiced. FIG. 8 illustrates an approach where a software vendor distributes its software product in object form, that is the object code/executables are generated/regenerated on the software vendor's system/systems 802, and then distributed to the licensee users' systems 804. The collected usage characteristic data employed in the generation of the object code/executables in accordance with the present invention are uploaded to the software vendor. The distribution of the object code/executables as well as the uploading of the collected usage characteristic data may be accomplished e.g. via a data link over a private corporate network, a modem link through a public switching telephone network (PSTN) or other public networks, such as the Internet. Alternatively, the distribution and the uploading may be accomplished via other media, such as tapes, diskettes, compact disks (CD) or digital versatile disks (DVD) and the like. Under this approach, the earlier described object code/executables generation databases/tools 106 incorporated with the teachings of the present invention are disposed and practiced on the software vendors' systems 802, while the collection of the usage characteristic data are performed on the licensee users' systems 804.

FIG. 9 illustrates one alternate approach where a software vendor distributes its software product in source form, that is the object code/executables are generated/re-generated on the licensee users' systems (or their proxies) 904. Examples of these proxies include but not limited to corporate and publisher servers. Note that any one of a number of security mechanisms, such as public key/private key, may be used to protect the source code, while practicing the present invention. Similar to the distribution of object code in FIG. 8, the distribution of source files 410 may be accomplished via any one of a number of data links or any one of a number of known recording media, such as those described earlier. Under this approach, in addition to the collection of usage characteristic data, the earlier described object code/executables generation databases/tools 106 incorporated with the teachings of the present invention are disposed and practiced on the licensee users' systems 904. Furthermore, for the illustrated embodiment, selected ones of the collections of object code/executable generation databases/tools 106 are also further enhanced with schedulers 906 to facilitate automated periodic regeneration of the object code/executables 104 on the user systems (or their proxies), taking into consideration usage characteristic data 102 collected on the user systems. (Note that the phrase "collected on the user systems" as used in this application is merely intended to refer to the "collection" itself. Upon collection, the data may be stored on the user systems or their proxies.)

Figure 10:
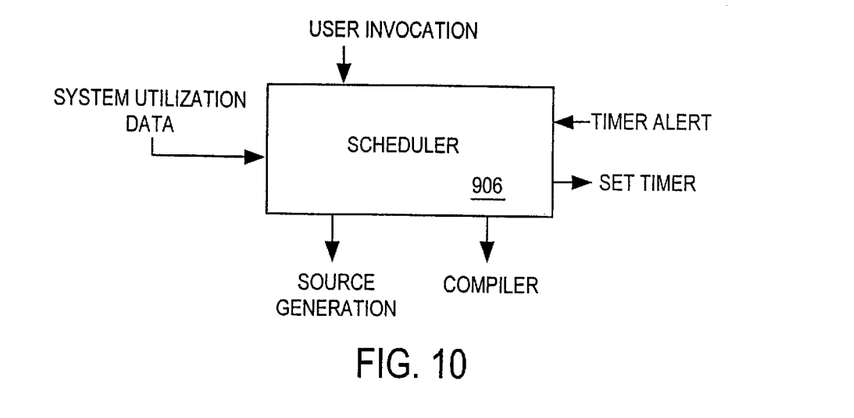
FIGS. 10–11 illustrate one embodiment of a scheduler suitable for use with the software distribution approach of FIG. 9.
Figure 11:
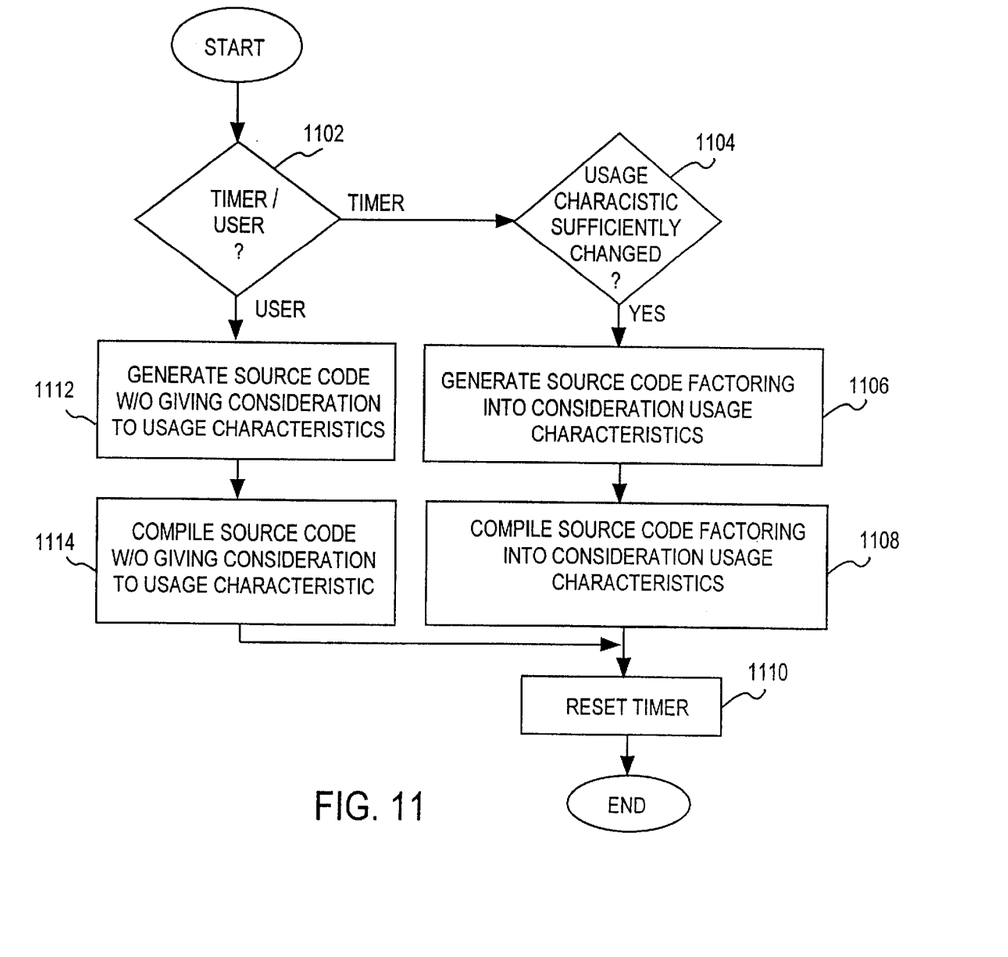

FIGS. 10–11 illustrate one embodiment of scheduler 906. As shown in FIG. 10, scheduler 906 includes logic for setting a timer, and logic in response to the expiration of the timer for invoking source generator 406 and compiler/linker 408 to practice the present invention as earlier described, that is to generate partial or total replacements for object code/executables 104 taking into consideration the collected usage characteristic data 102. For the illustrated embodiment, scheduler 906 also includes logic for retrieving system utilization data (such as CPU idle time and/or bus activity data) to determine the idle periods of the host system, and sets the above described timer to expire during these idle periods accordingly. Any one of a number of known techniques may be used to make the idle period determination. Furthermore, scheduler 906 also includes logic to assess whether the usage characteristics of the software objects are sufficiently different to warrant regeneration of object code/executables 104, to be described more fully below. Finally, scheduler 906 includes a user interface to facilitate a user in causing object code/executables 104 to be generated without regard to collected usage characteristic data 102. This last feature is useful in allowing the user to "roll back" automatic customization performed.

As shown in FIG. 11, upon invocation, scheduler 906 determines whether it was invoked by a user or as a result of the expiration of above described timer, step 1102. If scheduler 906 is invoked as a result of the latter condition, scheduler 906 further analyzes collected usage characteristic data 102 to determine if the usage characteristics have sufficiently changed to warrant regeneration of object code/executables 104, step 1104. As an example, the determination may be made by comparing a current set of collected usage characteristic data 102 with a saved set of previously collected usage characteristic data 102, and assessing the variation for a number usage characteristic metrics, such as whether the earlier described calling frequencies have changed by more than a predetermined percentage. Other usage characteristic metrics or techniques may be employed to make the sufficiency determination. If the usage characteristics have changed sufficiently to warrant regeneration of object code/executables 104, scheduler 906 proceeds to steps 1106–1108, where it invokes source generator 406 and compiler/linker 408 to generate replacements for object code/executables 104 taking into consideration collected usage characteristic data 102 as described earlier. Upon causing object code/executables 104 to be regenerated in the desired manner, scheduler 906 resets the system timer for a next idle period of the user's system (e.g. at midnight, a month from today or earlier), saves the current set of usage characteristic data, and reinitializes the data set employed to hold the usage characteristic data for the next evaluation period, step 1110. On the other hand, if it was determined at step 1104, the usage characteristics have not changed sufficiently to warrant regeneration of object code/executables 104, scheduler 906 simply proceeds to steps 1110 to reset the timer and so forth, as described earlier.

Back at step 1102, if it was determined that scheduler 906 was invoked by a user, scheduler 906 proceeds to steps 1112–1114, where it invokes source generator 406 and compiler/linker 408 to generate replacements for object code/executables 104 without taking into consideration collected usage characteristic data 102. Upon causing object code/executables 104 to be regenerated in the desired manner, scheduler 906 again resets the system timer and so forth, as described earlier, step 1110.

In alternate embodiments, additional granularity of control may be provided to the user to control the generation of replacements for object code/executables 104. For example, in addition to the above described ability for the user to invoke scheduler 906 to cause the regeneration to be performed without taking into consideration the collected usage characteristic data, additional ability may be supported to allow the user to invoke scheduler 906 to cause the regeneration to be performed taking into consideration a selected one of the saved usage characteristic data, thereby allowing the user to partially "roll back" the automatic customization selectively or completely "roll back" all automatic customization performed.

Figure 12:
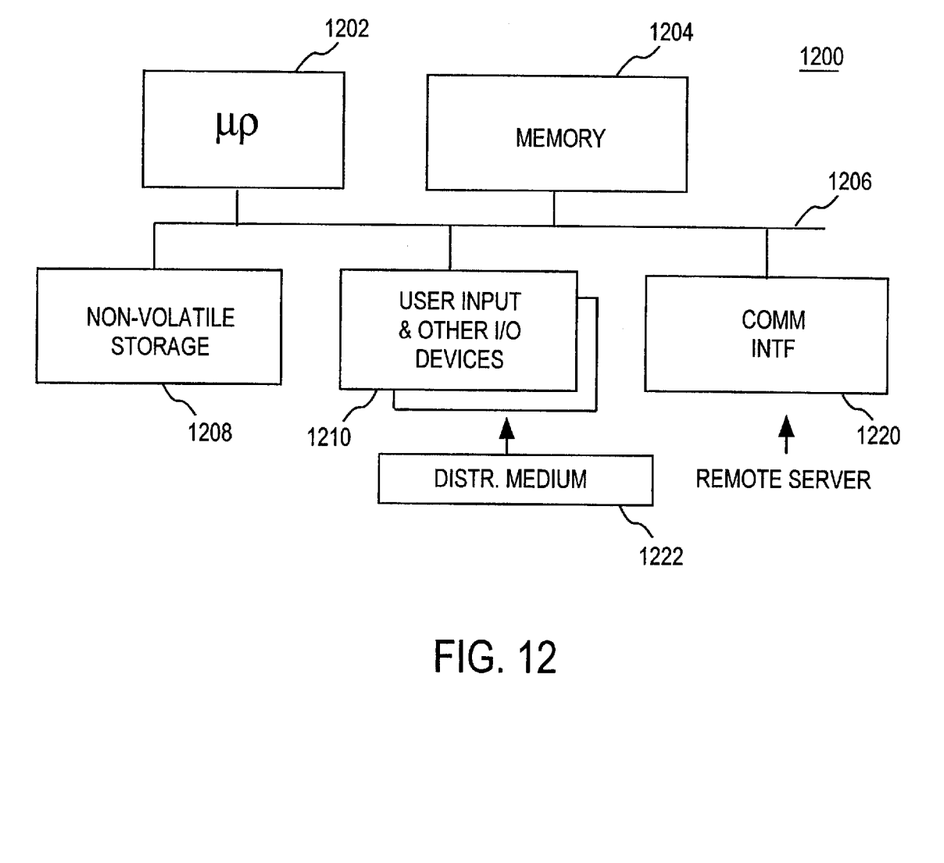
FIG. 12 illustrates one embodiment of an exemplary computer system suitable for use to practice the present invention.

FIG. 12 illustrates one embodiment of an exemplary computer system suitable for use to practice the present invention, in particular as a licensee user's system. As shown, exemplary computer system 1200 includes processor 1202 and system memory 1204 coupled to each other via system bus 1206. Coupled also system bus 1206 are non-volatile storage 1208, various user input/output devices 1210 and communication interface 1220. Each of these elements perform its conventional functions known in the art. In particular, system memory 1204 and non-volatile storage 1208 are employed to store a working copy and a permanent copy of the programming instructions implementing the teachings of the present invention. The permanent copy of the programming instructions may be loaded into non-volatile storage 1208 in the factory, or in the field, through distribution medium 1222 or through communication interface 1220. As described earlier, any one of a number of recordable medium such as tapes and so forth may be employed. The constitution of these elements 1202–1220 are also well known, and accordingly will not be further described.

Thus, methods and apparatuses related to a novel approach to software customization have been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An article of manufacture comprising:
   a recordable medium having recorded thereon a plurality of programming instructions for use to program an apparatus to enable the apparatus to be able to generate, for a first set of software objects having usage characteristic data collected, a second set of software objects to totally or partially replace the first set of software objects, the second set of software objects being generated based at least in part on the collected usage characteristic data of the first set of software objects, wherein the programming instructions further enable the apparatus to be able to collect said usage characteristic data of the first set of software objects, which includes at least a selected one of calling frequencies for caller and callee objects of the first set of software objects, and whether a function of the first set of software objects is invoked or not.

2. An article of manufacture comprising:
   a recordable medium having recorded thereon a plurality of programming instructions for use to program an apparatus to enable the apparatus to be able to generate, for a first set of software objects having usage characteristic data collected, a second set of software objects to totally or partially replace the first set of software objects, the second set of software objects being generated based at least in part on the collected usage characteristic data of the first set of software objects, wherein the programming instructions further enable the apparatus to be able to determine whether the generation should be performed or not based at least in part on the collected usage characteristic data, and conditionally perform the generation only if the determination indicates that the generation should be performed.

3. The article of manufacture of claim 2, wherein the programming instructions further enable the apparatus to be able to schedule said determination and conditional generation to be performed at selected ones of idle periods of the apparatus.

4. An apparatus comprising:
   a storage medium having stored therein a plurality of programming instructions; and
   a processor coupled to the storage medium to execute the stored programming instructions to generate, for a first set of software objects having usage characteristic data collected, a second set of software objects to totally or partially replace the first set of software objects, the processor generating the second set of software objects based at least in part on the collected usage characteristic data of the first set of software objects, wherein the processor further executes the programming instructions to collect said usage characteristic data of the first set of software objects, which includes at least a selected one of calling frequencies for caller and callee objects of the first set of software objects, and whether a function of the first set of software objects is invoked or not.

5. An apparatus comprising:

a storage medium having stored therein a plurality of programming instructions; and a processor coupled to the storage medium to execute the stored programming instructions to generate, for a first set of software objects having usage characteristic data collected, a second set of software objects to totally or partially replace the first set of software objects, the processor generating the second set of software objects based at least in part on the collected usage characteristic data of the first set of software objects, wherein the processor further executes the programming instructions to determine whether the generation should be performed or not based at least in part on the collected usage characteristic data, and conditionally executes the programming instructions to perform the generation only if the determination indicates that the generation should be performed.

6. The apparatus of claim 5, wherein the processor further executes the programming instructions to schedule said determination and conditional generation to be performed at selected ones of idle periods of the apparatus.

7. A computer implemented method comprising:

obtaining usage characteristic data collected for a first set of software objects; and generating a second set of software objects to totally or partially replace the first set of software objects, based at least in part on the obtained usage characteristic data for the first set of software objects, wherein the method further comprises collecting said usage characteristic data of the first set of software objects, which includes at least a selected one of calling frequencies for caller and callee objects of the first set of software objects, and whether a function of the first set of software objects is invoked or not.

8. A computer implemented method comprising:

obtaining usage characteristic data collected for a first set of software objects; and generating a second set of software objects to totally or partially replace the first set of software objects, based at least in part on the obtained usage characteristic data for the first set of software objects, wherein the method further comprises determining whether the generation should be performed or not based at least in part on the collected usage characteristic data, and conditionally performing said generation only if the determination indicates that the generation should be performed.

9. The method of claim 8, wherein the method further comprises scheduling said determination and conditional generation to be performed at selected ones of idle periods of the apparatus.

* * * * *